(12) United States Patent
Dawson et al.

(10) Patent No.: US 11,089,873 B1
(45) Date of Patent: Aug. 17, 2021

(54) FREE-STANDING BOARD WITH RETRACTABLE WHEELS

(71) Applicants: Dony Dawson, Fort Worth, TX (US); Jeffrey R. Weilert, Fort Worth, TX (US); Stephen Savoie, Keller, TX (US)

(72) Inventors: Dony Dawson, Fort Worth, TX (US); Jeffrey R. Weilert, Fort Worth, TX (US); Stephen Savoie, Keller, TX (US)

( * ) Notice: Subject to any disclaimer, the term of this patent is extended or adjusted under 35 U.S.C. 154(b) by 0 days.

(21) Appl. No.: 16/896,131

(22) Filed: Jun. 8, 2020

(51) Int. Cl.
*A47B 97/04* (2006.01)
*B43L 1/00* (2006.01)
*B43L 5/00* (2006.01)

(52) U.S. Cl.
CPC ............ *A47B 97/04* (2013.01); *B43L 1/00* (2013.01); *B43L 5/002* (2013.01)

(58) Field of Classification Search
CPC ............ A47B 97/04; B43L 5/002; B43L 1/00
USPC ............................... 248/441.1, 450, 451, 461
See application file for complete search history.

(56) References Cited

U.S. PATENT DOCUMENTS

| 1,810,826 | A | * | 6/1931 | Gray | G09F 5/02 184/108 |
| 5,941,713 | A | * | 8/1999 | Wayner | B43L 1/06 434/414 |
| 6,955,130 | B2 | * | 10/2005 | Phillips | A47B 97/04 108/189 |
| 2001/0054674 | A1 | * | 12/2001 | Turner | A47B 97/04 248/441.1 |
| 2020/0342794 | A1 | * | 10/2020 | Dalton | G09F 15/0018 |

* cited by examiner

*Primary Examiner* — Muhammad Ijaz
(74) *Attorney, Agent, or Firm* — Leavitt Eldredge Law Firm

(57) ABSTRACT

A mobile writing board system includes a frame extending from an upper portion to a lower portion; a writing board secured to the frame; a module secured to the lower portion of the frame; and a mobile device secured to the lower portion of the frame. The mobile device includes a housing; and a plurality of wheels configured to move within the housing while in a stationary position and configured to extend outside the housing during transit.

8 Claims, 9 Drawing Sheets

FREE-STANDING BOARD WITH RETRACTABLE WHEELS

BACKGROUND

1. Field of the Invention

The present invention relates generally to a free-standing wall with retractable wheels.

2. Description of Related Art

Writing board such as dry erase boards are well known in the art. FIG. 1 is an oblique view of a conventional writing board 101 having a frame 105 configured to support a board 103, which in turn is secured to a wall and/or other support structure (not shown). During use, the user writes on surface 107 of board 103 with a marker. Although effective in most applications of use, it should be understood that the limitation with board 101 is its limited mobility. There is a need for with boards and/or other similar types of writing boards to be mobile. Great strides in the area of writing boards have been made; however, many shortcomings remain and opportunities to create mobile writing boards exist.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
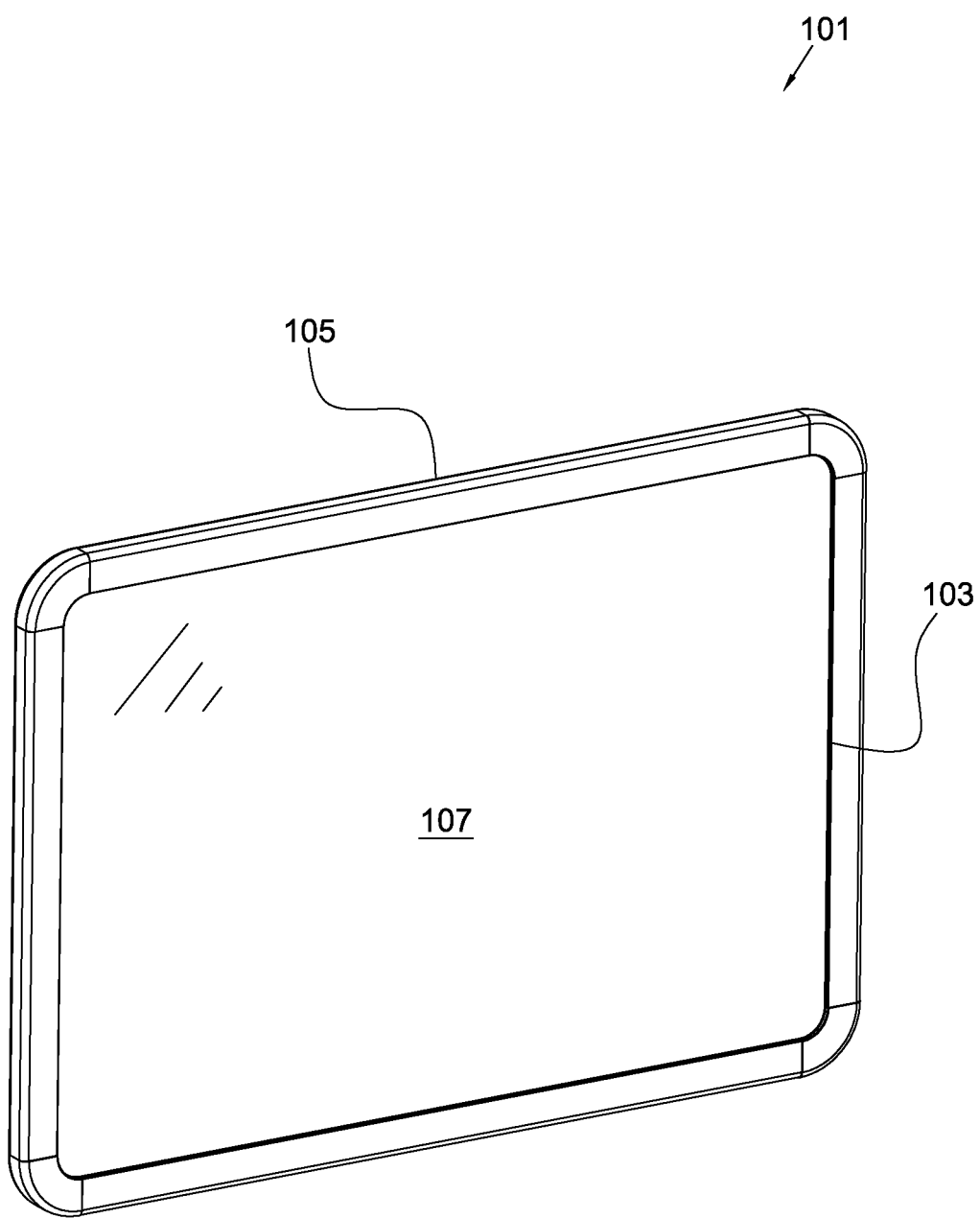
FIG. 1 is a side view of an oblique view of a conventional writing board.
Figure 2:
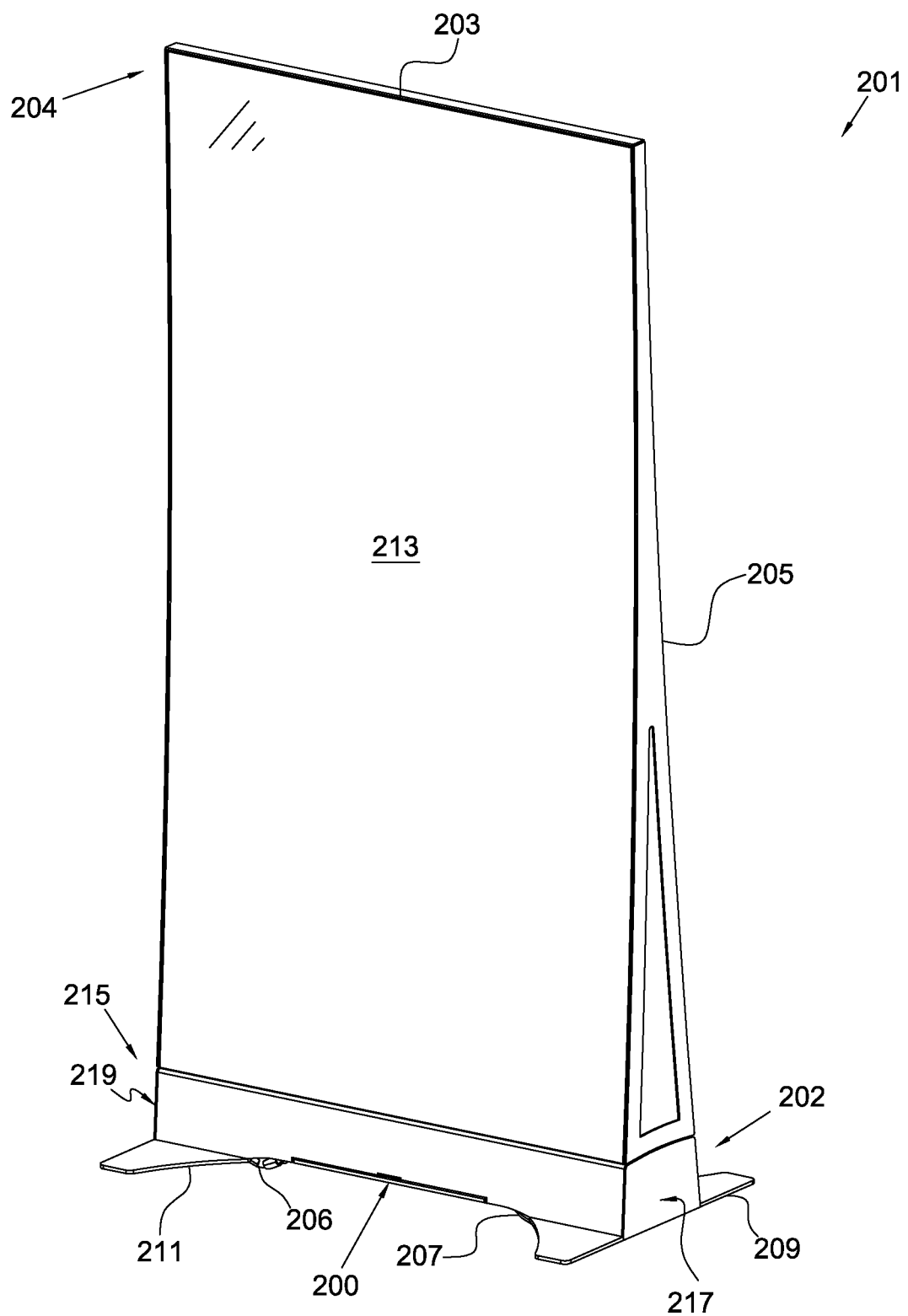
FIG. 2 is an oblique front view of a writing board system and method of use in accordance with a preferred embodiment of the present application.
Figure 3:
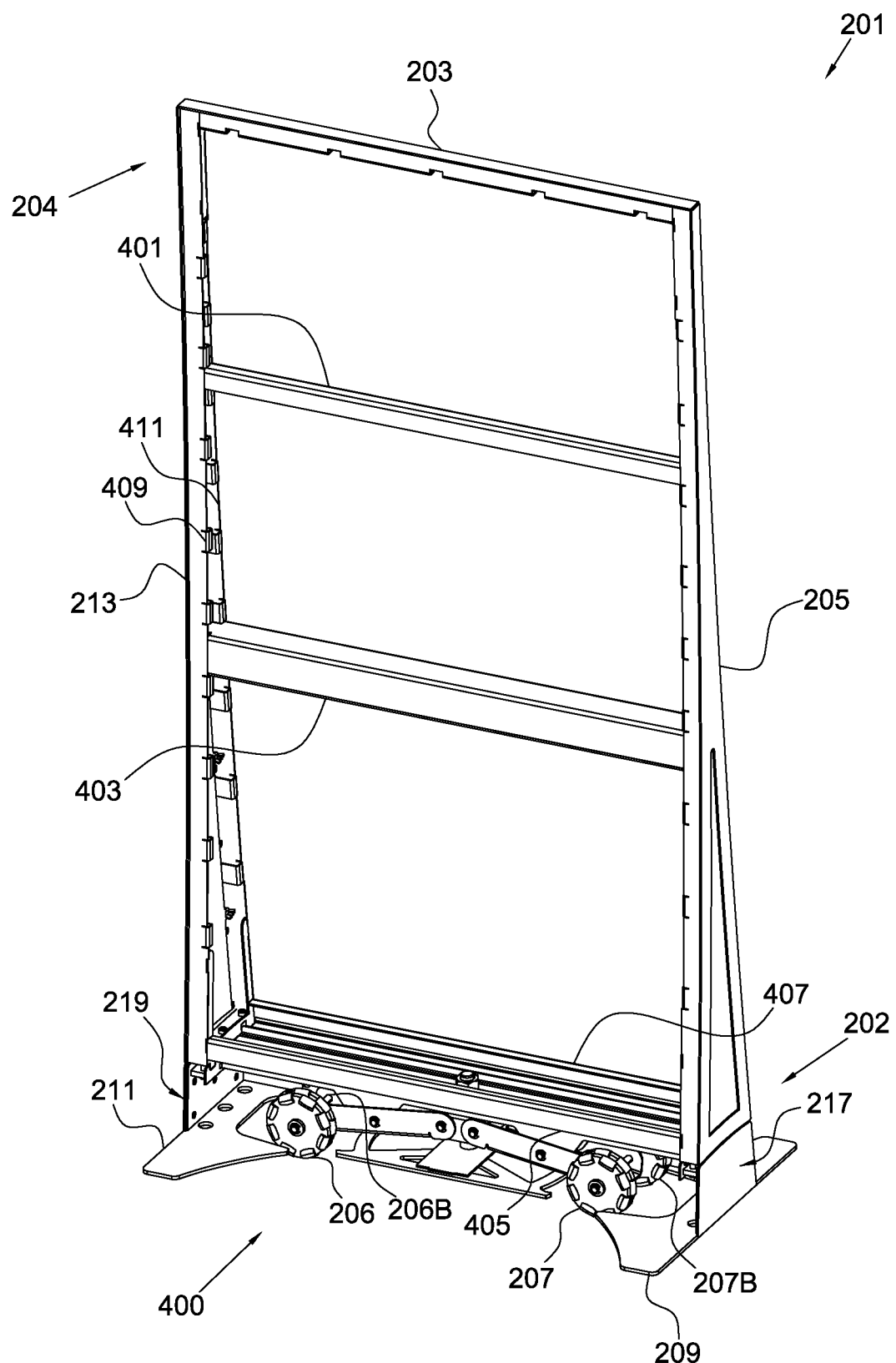
FIG. 3 is taken from FIG. 2 with the writing board removed.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-9 depict various embodiments of a writing board. It should be understood that the embodiments discussed herein are substantially similar in form and function and share one or more of the features discussed in each embodiment although the features may not be shown specifically with reference to the particular embodiment.

Referring specifically to FIGS. 2-6 in the drawings, an oblique view of a free-standing wall system 201 is shown in accordance with a preferred embodiment of the present invention. System 201 includes a frame 205 that extends from a top portion 204 to a bottom portion. It should be appreciated that the frame preferably gradually increases in width from top portion 204 to bottom portion 215. This feature enables a tilting of the board 203 secured thereto. During use, the user marks surface 213 of board 203 with a marker and/or similar means. In one embodiment, a second writing surface could be secured to frame 205 on an opposing side of board 203. The second writing surface could be utilized to write thereon or to secured items thereto.

One of the unique features believed characteristic of the present invention is the use of a mobile device 202 secured to the bottom portion 215 of frame 205. During use, the mobile device 202 is configured to enable movement of the system 201.

Figure 5A:
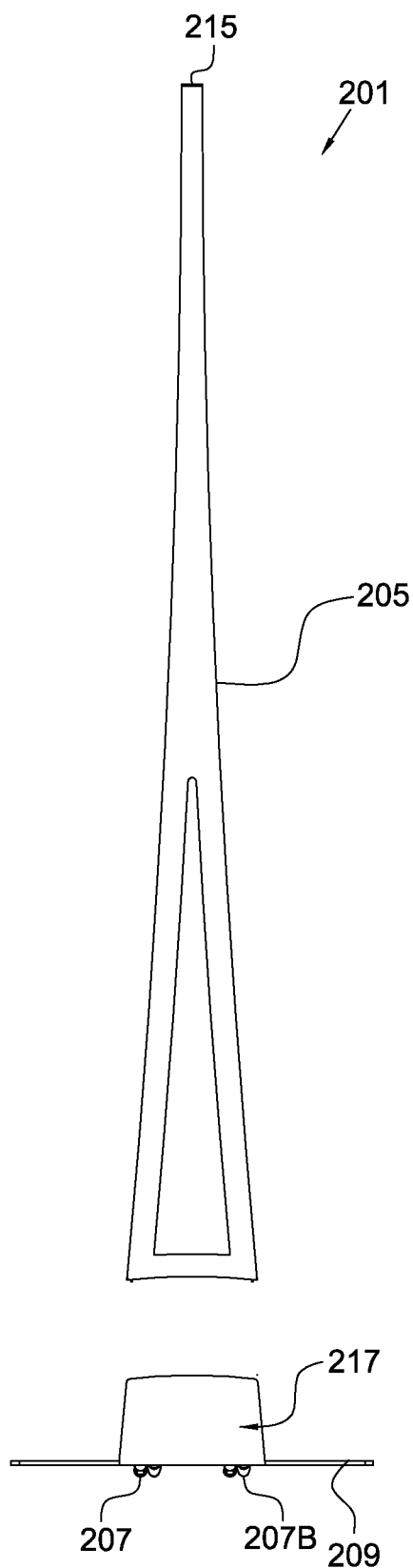
FIGS. 5A and 5B are side views of the system of FIG. 2.
Figure 5B:
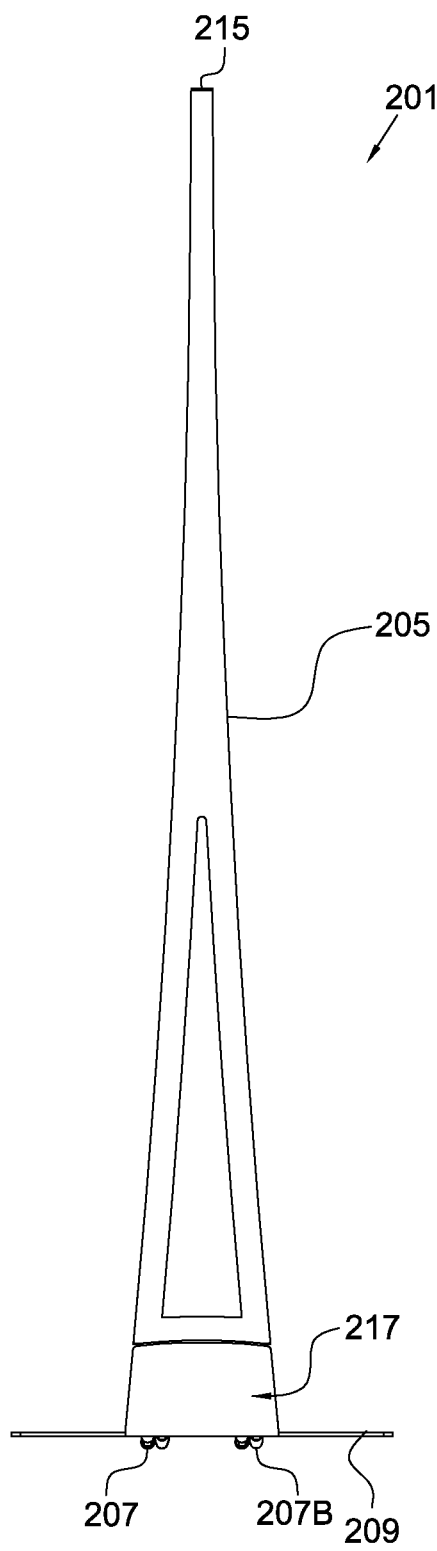

In one embodiment, the mobile device 202 includes a housing that extends from first end 217 to second end 219. A first footing 209 extends from first end 217 while a second footing 211 extends from the second end 219. When used, the footings 209, 211 provide support to frame 205 so as to prevent the system from falling as a user marks on surface 213. As shown in FIGS. 5A and 5B, the mobile device 202 can be removably attached to the frame 205 in one embodiment.

Figure 6:
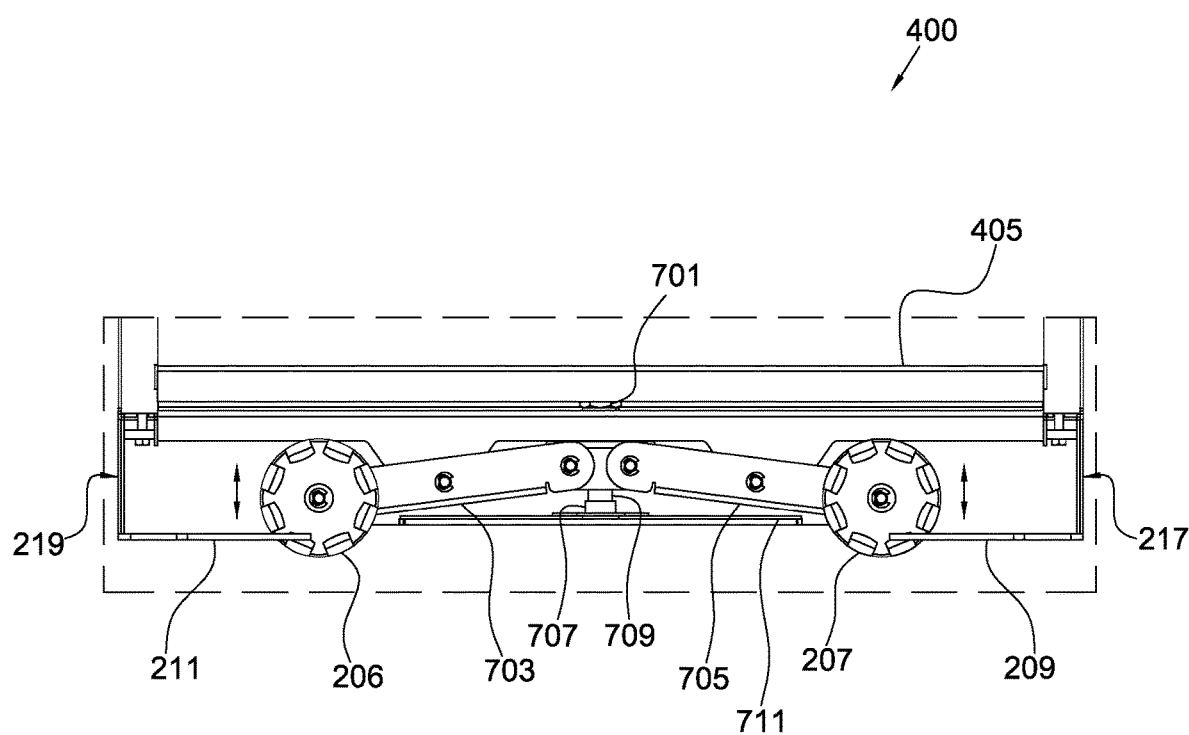
FIG. 6 is an exploded view of a section of FIG. 3.

Mobile device 202 is further provided with a plurality of wheels, e.g., wheels 206, 206B, 207, and 207B configured to enable movement of the system 201 during use. As shown in FIG. 6, mobile device 203 includes a lifting apparatus 400 associated with the wheels 206, 206B, 207, and 207B for lifting and lowering between two positions. As shown in FIG. 6, the lifting apparatus 400 has the wheels in the lowered position below footings 209, 211, which in turn enables the frame 205 to move on wheels 206, 206B, 207, and 207B. To achieve this feature, the lifting apparatus 400 includes a plurality of arms 703, 705 secured to the wheels and pivotally attached to a spring-loaded shaft 709 configured to slide relative to support 405 of frame 205. A fastener 701 is utilized to support shaft 709. A footer 709 is secured to shaft 709 and is configured to move the arms and shaft as pressure is applied thereto. For example, a user can apply downward pressure to footer 707, which in turn will cause the arms to pivot upward and the wheels to move within the housing. In this position, the frame 205 remains in a stationary position and footings 209, 211 are in contact with the ground surface. A user can also apply an upward force to footer 707, which in turn will cause the arms to pivot downward and the wheels to move outside the housing. In this position, the frame 205 is free to move on the wheels and footings 209, 211 are above the ground surface.

Figure 4:
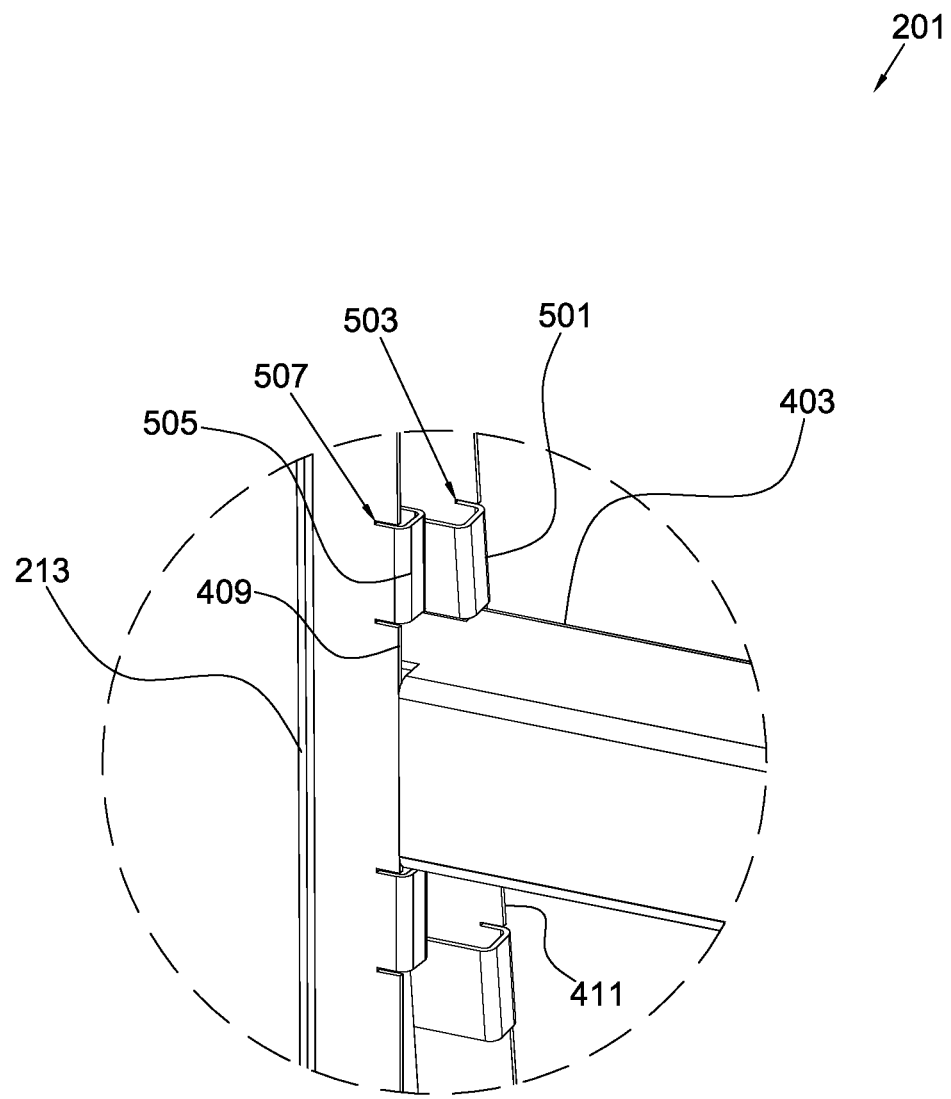
FIG. 4 is an exploded view of a section of FIG. 3.

Referring now specifically to FIG. 4, the components of frame 205 are shown. In one embodiment, the frame 205 includes a plurality of fasteners 503, 507 secured to respective supports 411, 409 and having respective bodies 501, 505 configured to engage with one or more writing boards, e.g., board 203. In one embodiment, the fasteners could be quick-release devices such as magnets, clips, clamps, hook-loop fasteners, and other suitable devices configured to releasably engage with the boards.

Figure 7:
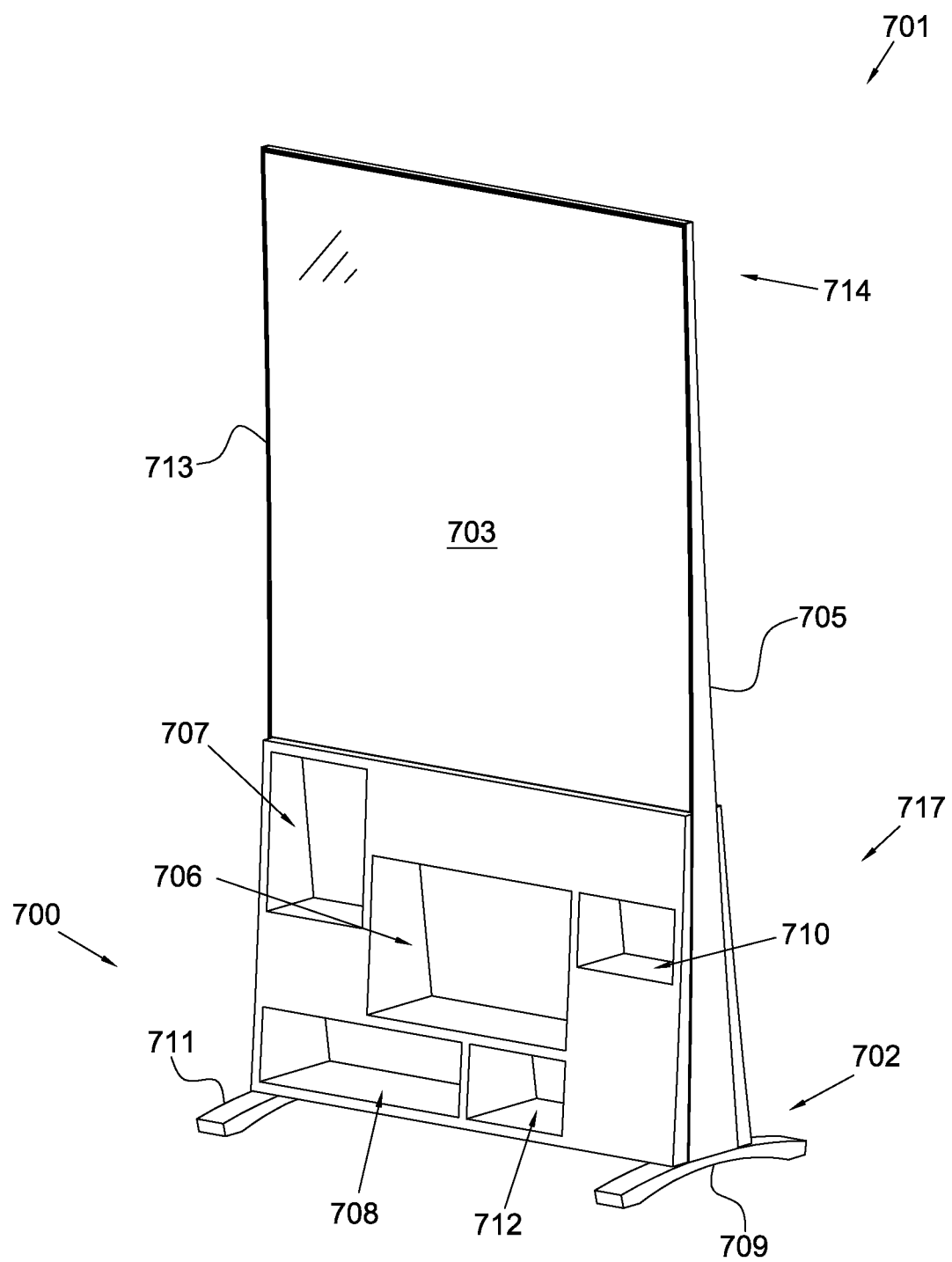
FIGS. 7, 8, and 9 are oblique views of alternative embodiments.
Figure 8:
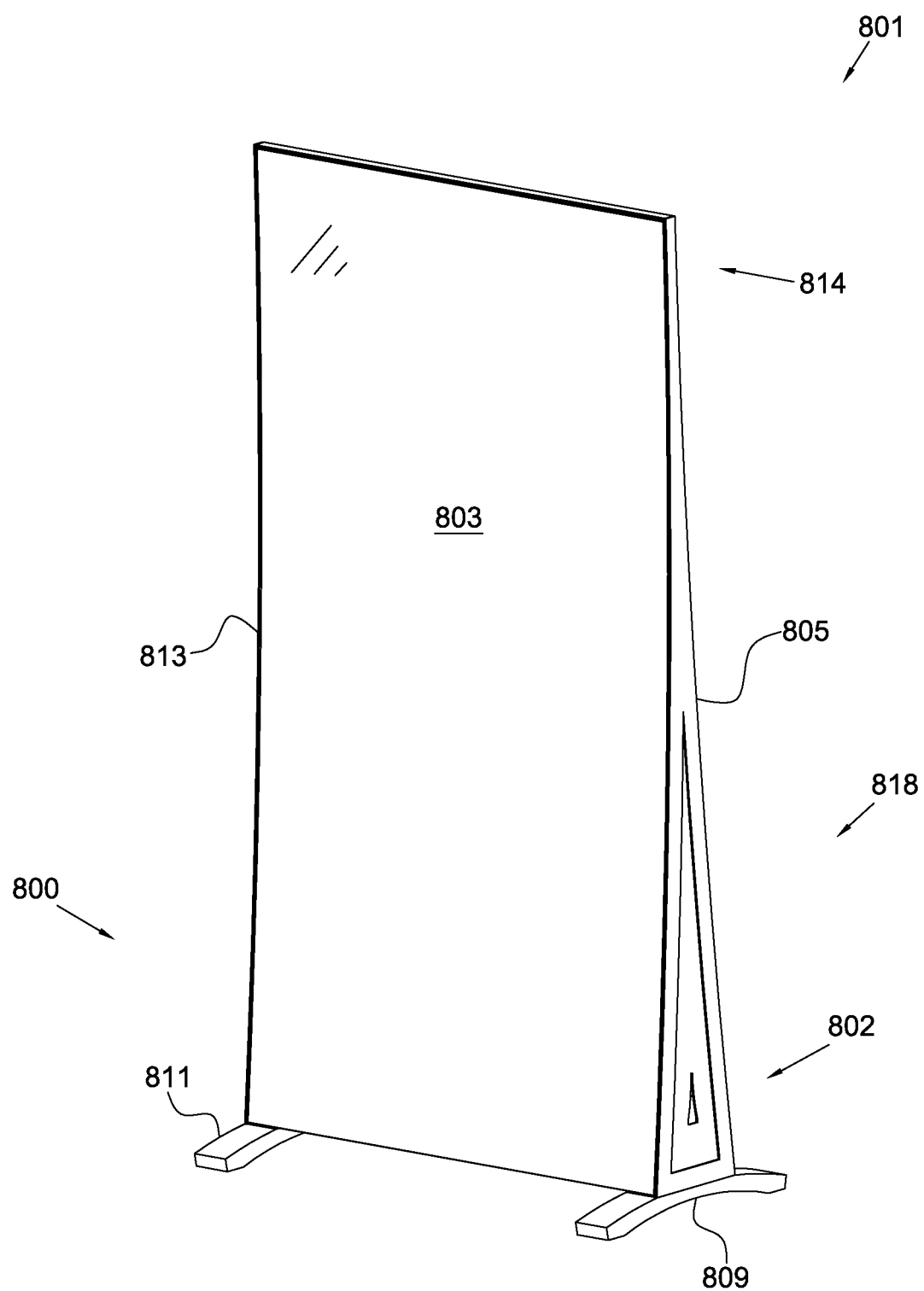
Figure 9:
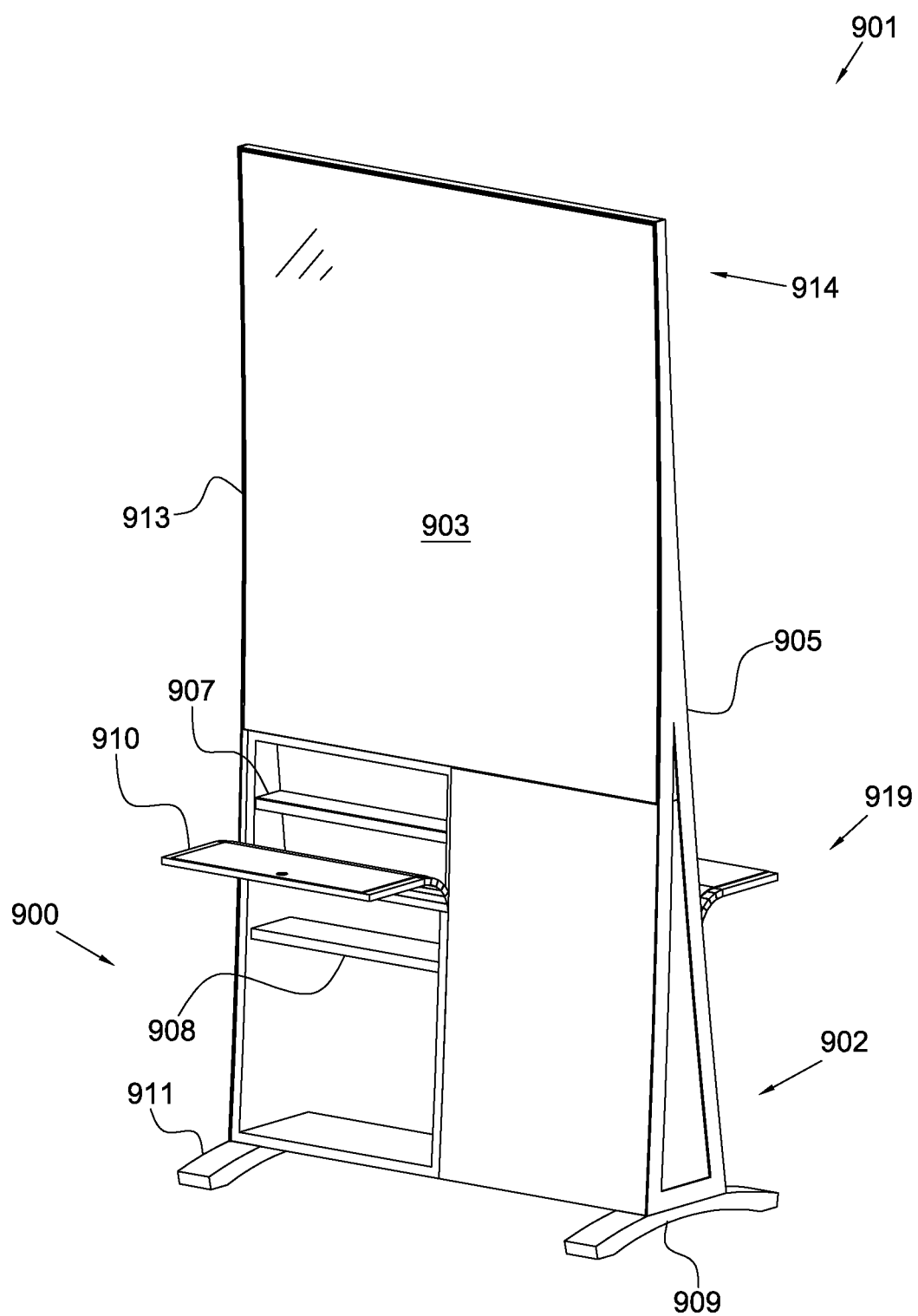

Referring now to FIGS. 7-9 in the drawings different alternative embodiments of system 201 are shown. It will be appreciated that the features of system 701, 801, and 901 are substantially similar in form and function to system 201 and includes one or more of the features discussed herein.

In FIG. 7, an oblique view of system 701 is shown having a frame 705 extending from a lower section 702 to an upper section 714. A board 713 is secured to frame 705 and is positioned above a removable module 700. During use, the user marks on the surface 703 of board 713. In the preferred embodiment, the system 701 is secured in position via a plurality of footings 709, 711 that rest on the ground surface.

One of the unique features believed characteristic of the present invention is the use of a removable module 700 configured to removably attach to frame 705. As shown, the module may be configured with different compartments and devices. In the present embodiment, the module 700 includes a plurality of compartments 706, 707, 708, 710, and 712. It will be appreciated that the module could include compartments on opposing sides, e.g., side 711 of the module.

In FIG. 8, an oblique view of system 801 is shown having a frame 805 extending from a lower section 802 to an upper section 814. A board 813 is secured to frame 805 and is positioned above a removable module 800. During use, the user marks on the surface 803 of board 813. In the preferred embodiment, the system 801 is secured in position via a plurality of footings 809, 811 that rest on the ground surface. It is shown in the present embodiment a system without wheels.

In FIG. 9, an oblique view of system 901 is shown having a frame 905 extending from a lower section 902 to an upper section 914. A board 913 is secured to frame 905 and is positioned above a removable module 900. During use, the user marks on the surface 903 of board 913. In the preferred embodiment, the system 901 is secured in position via a plurality of footings 909, 911 that rest on the ground surface.

One of the unique features believed characteristic of the present invention is the use of a removable module 900 configured to removably attach to frame 905. As shown in FIG. 7, the module may be configured with different compartments and devices. In the present embodiment, the module 900 includes a plurality of shelves 907, 908, along with a plurality of tables 910, 919 that extend from module. It will be appreciated that the module could include tables and shelves on opposing sides, as depicted in FIG. 9.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mobile writing board system, comprising:
a frame extending from an upper portion to a lower portion;
a writing board secured to the frame;
a module secured to the lower portion of the frame;
a mobile device secured to the lower portion of the frame, the mobile device having:
a housing; and
a plurality of wheels configured to move within the housing while in a stationary position, and configured to extend outside the housing during transit; and
a lifting apparatus disposed within the housing and configured to lift and lower the plurality of wheels.

2. The system of claim 1, wherein the frame increases in width from the upper portion the lower portion.

3. The system of claim 1, the frame comprising:
a plurality of horizontal supports rigidly attached to a plurality of vertical supports.

4. The system of claim 1, the frame further comprising:
a plurality of fasteners secured to a vertical support and configured to engage with the writing board.

5. The system of claim 1, wherein the module is removably attached to the frame.

6. The system of claim 1, the module comprising:
a plurality of compartments extending inwardly from an outer surface of the module.

7. The system of claim 1, the module comprising:
a plurality of shelves secured within a plurality of compartments extending inwardly from an outer surface of the module.

8. The system of claim 1, the module comprising:
a table pivotally attached to the module and configured to pivot in a direction away from the frame.

* * * * *